Nov. 20, 1923

G. A. URBACH

TIRE TREATING MACHINE

Filed July 18, 1919

INVENTOR
Gustave A. Urbach
BY
ATTORNEY

Nov. 20, 1923
G. A. URBACH
TIRE TREATING MACHINE
Filed July 18, 1919
1,474,654
5 Sheets-Sheet 2

INVENTOR
Gustave A. Urbach
BY
J A Procter
ATTORNEY

Nov. 20, 1923. 1,474,654

G. A. URBACH
TIRE TREATING MACHINE
Filed July 18, 1919   5 Sheets-Sheet 3

INVENTOR
Gustave A. Urbach
BY
J. M. Procter
ATTORNEY

Nov. 20, 1923.                                              1,474,654
G. A. URBACH
TIRE TREATING MACHINE
Filed July 18, 1919     5 Sheets-Sheet 5

INVENTOR
Gustave A. Urbach
BY
J A Procter
ATTORNEY

Patented Nov. 20, 1923.

1,474,654

UNITED STATES PATENT OFFICE.

GUSTAVE A. URBACH, OF PITTSBURGH, PENNSYLVANIA.

TIRE-TREATING MACHINE.

Application filed July 18, 1919. Serial No. 311,874.

*To all whom it may concern:*

Be it known that I, GUSTAVE A. URBACH, a citizen of the United States, and a resident of Pittsburgh, in the county of Allegheny and State of Pennsylvania, have invented a new and useful Improvement in Tire-Treating Machines, of which the following is a specification.

My invention relates to machines used in the manufacture of tires and particularly to machines for treating the interior surfaces of pneumatic tire casings such as are used for automobiles, motorcycles, bicycles and the like.

One object of my invention is to provide a machine of the above indicated character that shall facilitate the rapid manipulation and treatment of tires.

Another object of my invention is to provide a tire treating machine that shall have means for simultaneously and successively treating the several tires of a continuous train as they are fed into the machine and also means for co-operating with the treating means to automatically advance the tires from position to position to and away from the machine.

Another object of my invention is to provide a tire treating machine that shall have means to so actuate the tires being treated as to cause the same to move by their own momentum through a sequence of receiving, treating and discharging positions.

More specifically, the object of my invention is to provide a machine for coating and drying tires, in effecting which, by reason of the particular coating material employed and the method of distributing the material, other objects, setting forth the several co-operating means by which the machine effectually accomplishes its ends, will be hereinafter disclosed.

In Patent No. 1,231,222 granted to me June 26, 1917, an apparatus is disclosed for spraying the interior surfaces of pneumatic automobile tire casings. In this device, a tire is manually lifted to position where it is subjected to the above mentioned treatment and afterwards lifted from the machine.

In practicing my present invention, I provide a machine in which a tire is similarly treated but that has such automatic features that the reception and disposal of a succession or train of tires to be coated is facilitated. The device is also provided with means for predetermining the amount of material to be placed on the tire, and with means for drying the material before the tire is discharged from the machine, to thus add greatly to the effectiveness and completeness with which the tire is treated.

In the accompanying drawings.

Figure 1:
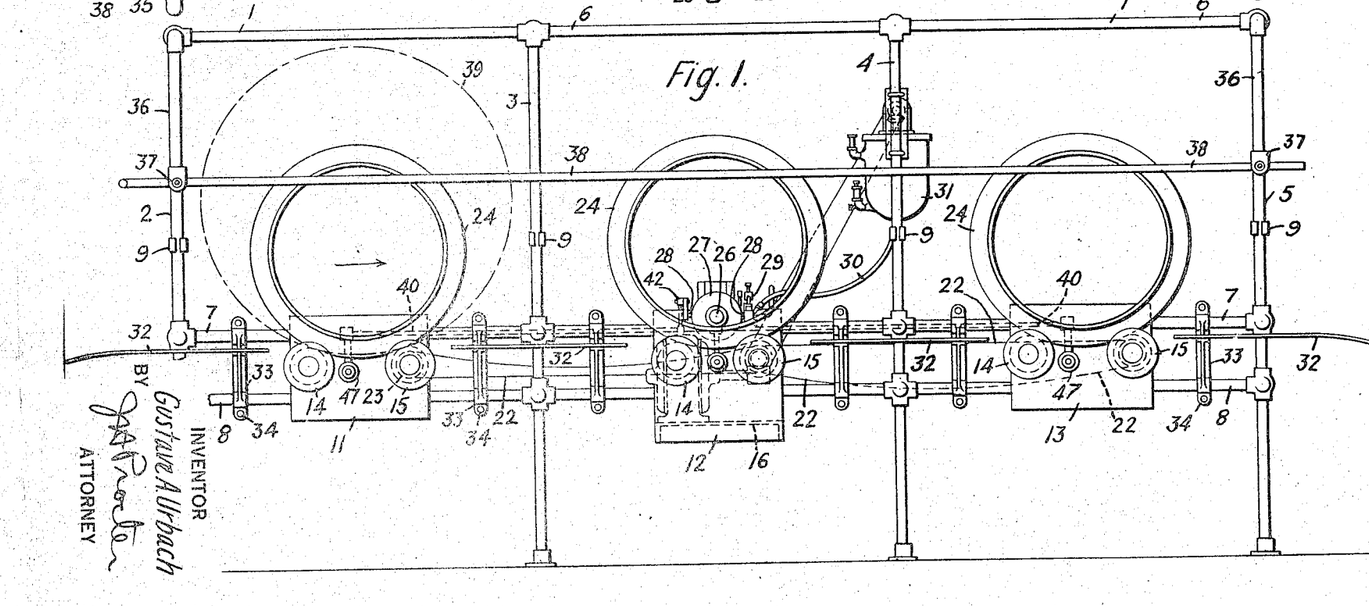
Figure 1 is a front elevational view of a machine embodying my invention.
Figure 2:
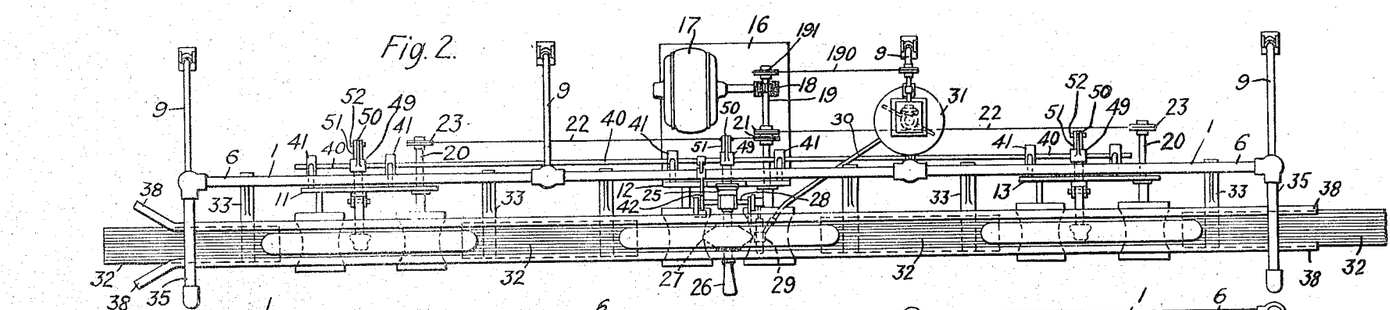
Fig. 2 is a top plan view of the device shown in Fig. 1.
Figures 3, 4, 5, 6, 7, 8:
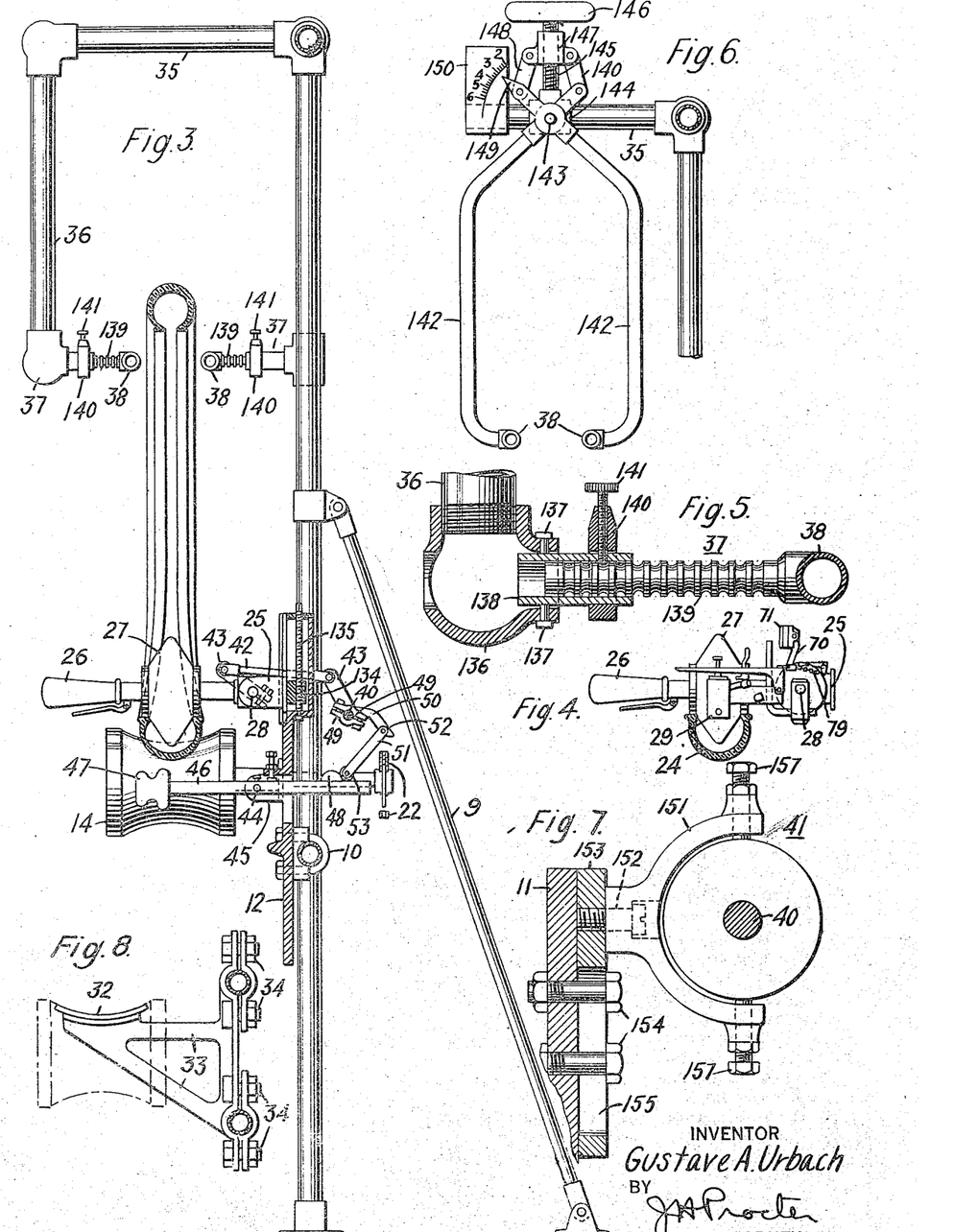
Fig. 3 is a view, partially in end elevation and partially in central-section, as viewed from the right of the device shown in Figs. 1 and 2.
Fig. 4 is a detail view of the coating device and one form of device for determining the amount of coating material, the view being shown to the same scale and similarly positioned as one portion of Fig. 3 wherein the devices shown in Fig. 4 are omitted for clearness.
Fig. 5 is an enlarged detail view, partially in section and partially in elevation, of one form of adjustable tire guiding device.
Fig. 6 is a detail view of a modified form of adjustable tire guiding device having means for indicating the size of the tire for which it is adjusted.
Fig. 7 is a detail view of a universal bearing member employed in the machine.
Fig. 8 is a detail end view of a stationary support for conducting a tire to and from its different treating positions.
Figure 9:
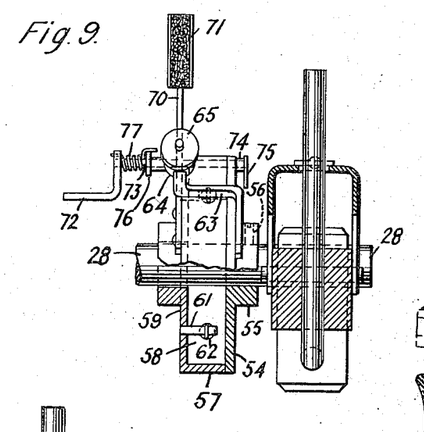
Fig. 9 is an enlarged detail front view of the device shown in Fig. 4 for determining the amount of coating material to be placed on a tire.

My device comprises, in general, a frame 1, as shown in Figs. 1, 2 and 3, preferably constructed of gas pipe and comprising four vertical posts 2, 3, 4 and 5, three horizontal cross pieces 6, 7 and 8 and inclined braces 9 that are attached at their upper ends to the posts, and at their lower ends to the floor. Secured to the front sides of the cross pieces 7 and 8, by means of U-bolts 10 shown in Fig. 3, are plates 11, 12 and 13 each supporting an idler roll 14 and a driven roll 15; the plate 12 having a rearwardly-projecting horizontal portion 16 that supports an electric motor 17, or any other suitable prime mover for driving the machine.

The apparatus included between the posts 3 and 4, except for parts co-operating with the addended mechanism which will be hereinafter fully described, is clearly set forth in the above mentioned patent and will not be referred to except in so far as a full and clear understanding of the present machine is concerned.

The motor 17 is connected by a worm and gear 18, shown in Fig. 2, to a shaft 19, on which the driven roll 15 of the plate 12 is mounted, and to shafts 20 carrying the rolls 15 of the plates 11 and 13, through sprocket wheels 21 on the shaft 19, chains 22 and sprocket wheels 23 on the shafts 20. By this arrangement, the rolls 15 are simultaneously rotated to impart a rotating motion to tires 24 supported on the several pairs of rolls 14 and 15.

The front face of the plate 12 is provided with a vertical groove that constitutes a guideway for a block 25 to which a handle lever 26, carrying a V-shaped idler roll 27 for entering and spreading the opening in the inner circumference of a tire casing, is pivoted by a rod 28. The rod 28 which is fixed to, and turns with, the lever 26 when the latter is actuated to raise and lower the roll 27 with respect to a tire 24, also carries a sprayer 29 that enters the tire adjacent where it is spread by the roll 27 and is connected by a pipe or hose 30 to a tank 31 carried by the upper part of the frame.

Plates or running boards 32, leading to and from each set of rolls 14 and 15 and disposed substantially on a level with the tire-supporting surfaces thereof, are supported by brackets 33 that are attached to the cross pieces 7 and 8 by bolts 34 as shown in Fig. 8. The end plates 32 may be suitably bent or constructed to direct the tires to and from the machine in any desired direction.

Relatively-short sections of pipe or arms 35 project horizontally and forwardly from the upper corners of the frame 1 and support, at their outer ends, other relatively-short arms 36 that project vertically downward therefrom. At the lower ends of the arms 36, and on the posts 2 and 5 opposite the lower ends of the arms 36, adjustable mechanisms 37, to be hereinafter described, support horizontal parallel guide rods 38 that extend parallel to the plates 32 and the rolls 14 and 15 across the front of the machine to support the tires as they are conducted from position to position. The rods 38 are at such elevation as to accommodate the extremes in sizes of tires, the smallest and largest being indicated by the tires 24 and the broken line circle 39, respectively, between the posts 2 and 3 as shown in Fig. 1.

A horizontal shaft 40, extending parallel to and along the rear of the frame 1, is supported by bearing members 41, on the plates 11, 12 and 13 and to be hereinafter described, and is so connected by a link 42 and levers 43 to the rod 28, that, as the handle lever 26 is raised and lowered, the shaft 40 will receive a turning or back-and-forth rocking movement about its axis.

Beams 46, normally substantially parallel to the axes of the rolls, extend, through openings in the plates 11, 12 and 13 to points beneath the tires 24. The beams are pivoted at intermediate points by pins 44, in bifurcated bearing lugs 45 between each set of rolls 14 and 15. The beams 46 are disposed nearer the rolls 14 than the rolls 15 for purposes hereinafter set forth. At the outer end of each beam 46, is a freely rotatable idler roll 47 and rigidly secured to the other end is a substantially semi-cylindrical cam or stop member 48.

Arms 50 are clamped to the shaft 40, by complementary bolted members 49, and each forms a part of one of the members 49 and pivotally supports a link 51 on a pin 52. Each link 51 supports a roller 53 at its lower end that, in the operative position of the spreader roll 27, occupies the position, with respect to the cam member 48, shown in Figs. 3 and 13.

In the operation of the machine, while the rolls 15 are being driven in the counter-clockwise direction, as viewed in Fig. 1, tires are rolled or otherwise fed upon the rolls 14 and 15 of the plates 11 and 12 and the spreader roll 27 lowered to spread the sides of the tire. This admits the sprayer to the tire, after which the spraying operation may be controlled as described in the above mentioned patent.

When the tire at the central section of the frame 1 has been treated, the spreader roll 27 and the sprayer 29 are lifted therefrom by means of the handle 26. This turns the rod 28 in the clockwise direction, as viewed in Fig. 3, which also turns the shaft 40, in the clockwise direction, through the link 42 and the levers 43.

The spreader roll 27 being then free of the tire, the arms 50 and the links 51 actuate the rollers 52 against the cam members 48 to turn the beams 46 about the pins 44. This causes the idler rollers 47 to suddenly engage the tires and to thus so change the center of gravity of the tires as to permit the momentum thereof to lift them from the rolls 14 and 15. After the beams 46 have been turned by the links 51 to initiate the lifting of the tires the rollers 53, roll over the cam members 48 thus permitting the shaft 40 to turn and the spreader roll to be thrown to its farthermost position with respect to the tire while disconnected from the beams 46. This permits the rollers 47 to fall out of the path of the succeeding tire and be reset in the position shown in Figs. 3 and 13 with respect to the links 51 when the latter are again actuated with the spreader roll. The tires having been driven in the clockwise direction, as viewed in Fig. 1, by reason of their engagement with the rolls 15, will, when their center of gravity is shifted by the rollers 47, roll by their own inertia, along the running boards 32 to the next succeeding pair of the rolls 14 and 15.

The rolls 14 and 15, between the posts 4 and 5 receive and rotate a coated tire while the following tire is being coated, thus permitting the coating material to set. This additional drying treatment, which is effected by the combination of centrifugal action and air currents during the time that the following tire is being coated, prevents the coating material from flowing to the bottom of the tire and assures its even distribution over the inner surface thereof, thus effecting a more perfectly treated tire and facilitating its handling after it has left the machine.

The rolls 14 and 15 between the posts 2 and 3 are provided to support and rotate a tire and have it in readiness to take its place for the coating treatment.

With the three tires 24 in position, as in Fig. 1, manipulation of the handle 26 to release the sprayer and spreader roll from a coated tire, automatically advances the tires from position to position and away from the machine, thus providing means for the rapid treating of the several tires of a continuous train.

In Figs. 4, 9, 10, 11 and 12 is shown a device for determining the amount of coating material to be applied to a tire, by marking the tire at the beginning of the coating treatment. It comprises a discoidal member 54 having a flange or collar 55 through which it is fixed to the rod 28 by a pin 56 or other suitable means.

Oppositely facing the member 54, but having an annular flange 57 by which it is spaced from the member 54 to form a chamber 58 therebetween, is a similar member 59 loosely mounted on the rod 28. In the chamber 58, pins 60, on the member 54, and pins 61, on the member 59, are connected by helical springs 62. Fixed to the outer surface of the member 54 is a bracket 63 supporting a cylinder 64 having a centrally apertured cap 65 at one end and a relatively-small aperture at its other end. A plunger rod 66 extending through the apertures in the cap 65 and the cylinder 64 has a collar 67 thereon adjacent the apertured end of the cylinder that is embraced by a helical compression spring 68 extending between the collar 67 and the cap 65. The spring 68, thus, biases the exposed end 69 of the rod 66 to the right as viewed in Fig. 10.

An arm 70 is secured to the member 59, and is thereby loosely turnable about the rod 28. The arm 70 is disposed in alignment with the rod 66 and carries an inked pad 71 at its outer end.

Figures 10, 11:
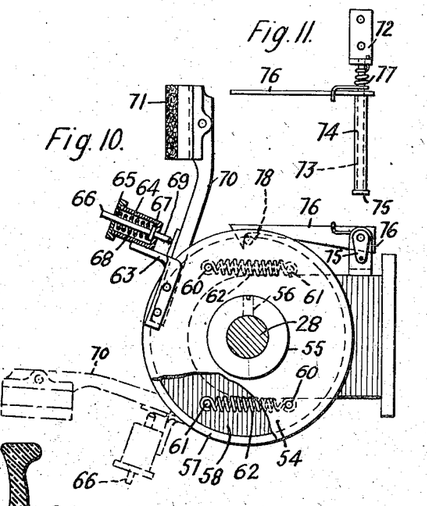
Fig. 10 is an enlarged detail view of the device of Fig. 9 as positioned in Fig. 4.
Fig. 11 is a plan view of a portion of the device shown in Fig. 10.
Figures 12, 13, 14, 15:
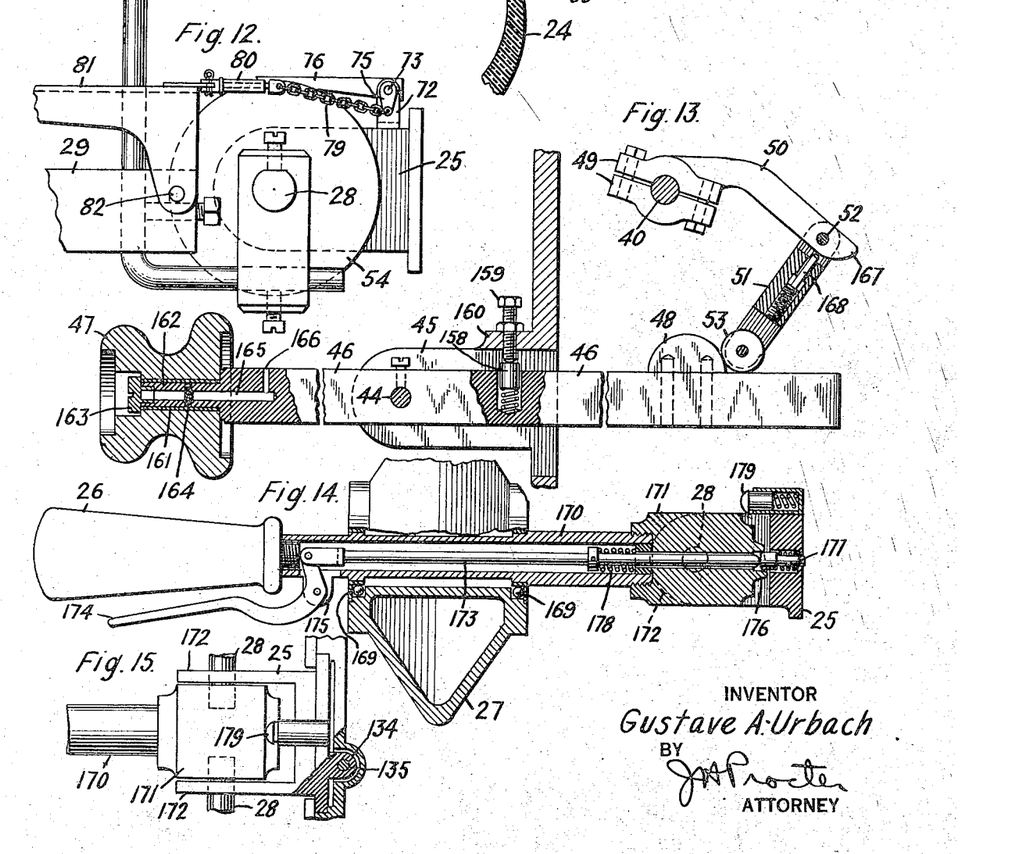
Fig. 12 is an enlarged detail view of a portion of the device shown in Fig. 4.
Fig. 13 is an enlarged detail view of a mechanism for actuating the tires to advance the same from position to position.
Fig. 14 is an enlarged detail view of a roll for spreading a tire and the attending latch mechanism therefor.
Fig. 15 is an enlarged detail plan view of a carriage member for raising and lowering the spreader roll, and the attending mechanism, to adjust for different sizes of tires.

A bracket 72 of L-shape is rigidly secured to the block 25 shown in Figs. 10 and 12. A pin 73 on the upper arm of the bracket 72 projects towards the member 59 and has a loosely mounted sleeve 74 thereon. The sleeve 74 is provided at its outer end with a depending lever arm 75 and at its other end with a horizontal latch arm 76 that is biased downwardly by a spring 77 surrounding one portion of the pin 73 and having one end fixed to the upper arm of the bracket 72. The latch arm 76 is adapted to engage a pin 78 in the member 59 to hold the latter in the position shown in Figs. 9 and 10. The lower end of the lever arm 75 is connected by a chain 79 through a swivel connector or adjustable turn-buckle device 80 to an operating lever 81 of the sprayer 29 that is pivoted to the sprayer by a pin 82.

Being fixed to the rod 28, when the spreader roll is lowered to operative position with respect to a tire, the member 54 will turn with the rod 28 and carry the plunger rod 66 and its support to the position indicated by the broken lines in Fig. 10 but the arm 70, by reason of the relation between the latch arm 76 and the pin 78, will remain in its upper position. When the sprayer is actuated to begin the spraying operation, by depressing the lever 81 shown in Fig. 12, the latch arm 76 will be lifted from the pin 78 to suddenly release the arm 70. When released, the arm 70 will carry the inked pad 71 towards the rim of the tire 24 as shown in Fig. 10, to imprint a mark thereon, and be immediately withdrawn therefrom by the plunger rod 66 to the position shown in broken lines Fig. 10. With the tire thus marked, at the beginning of the spraying operation, an operator is able to determine, by the angular movement of the tire, the exact amount of coating material desired.

Figure 19:
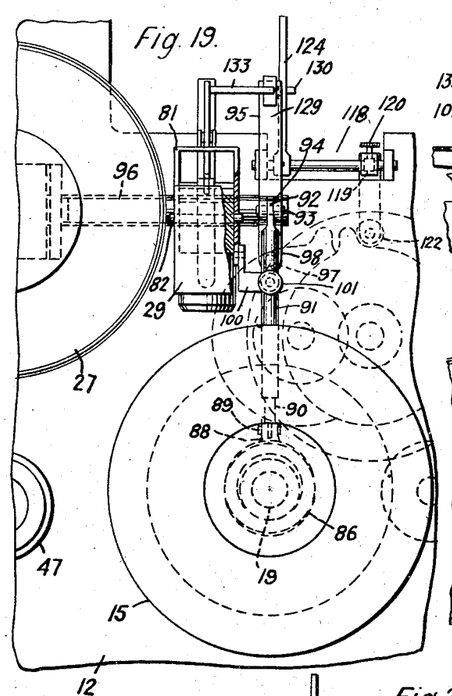
Fig. 19 is a front view of a modified form of device for determining the amount of coating material to be placed on a tire.
Figure 20:
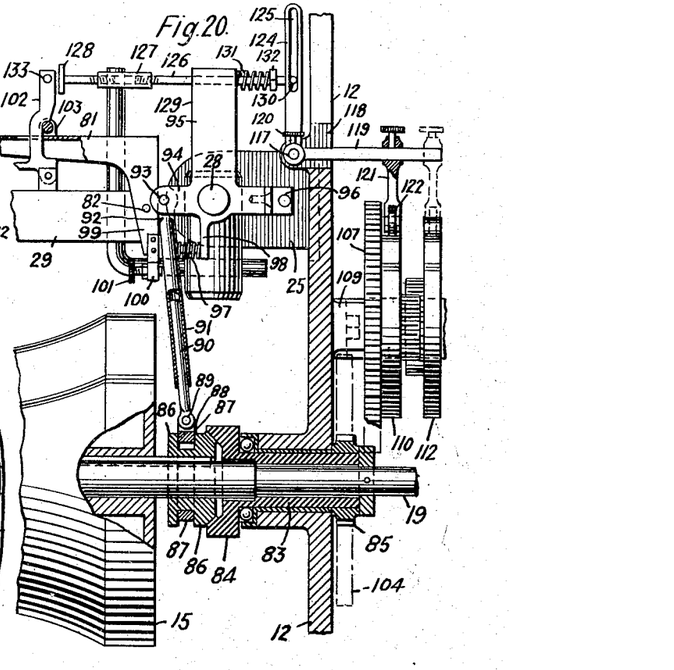
Fig. 20 is a view, partially in side elevation and partially in section, of the device shown in Fig. 19.
Figure 21:
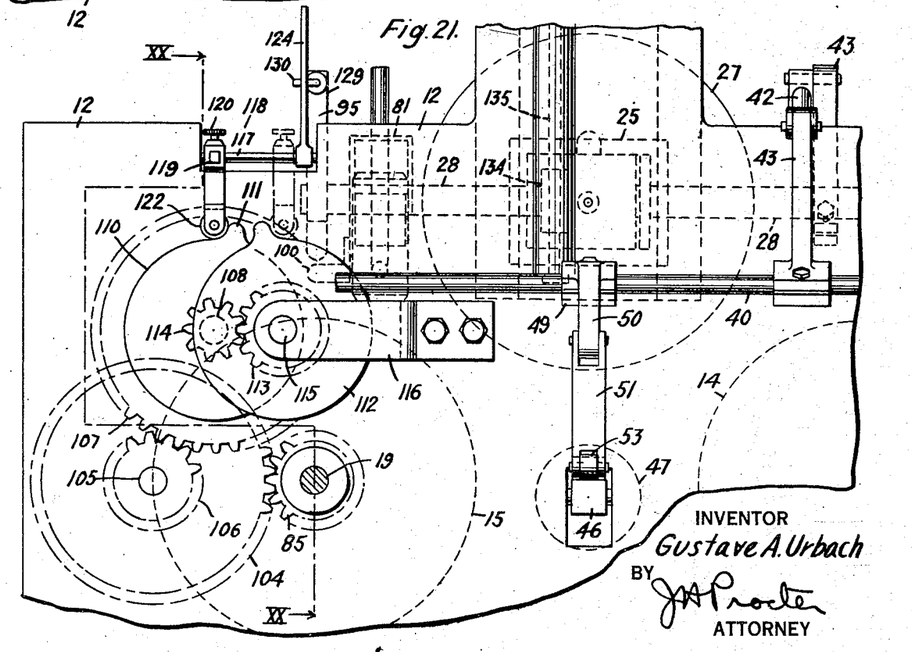
Fig. 21 is a rear elevational view of the device shown in Figs. 19 and 20.

In Figs. 19, 20 and 21 is illustrated a mechanism for automatically determining the amount of coating material which it is desired to place on a tire.

In Fig. 20 a sleeve 83, loosely embracing the drive shaft 19 at its place of bearing in the plate 12, is provided at its front end with a clutch member 84 and at its other end behind the plate 12 with a pinion 85 that is rigidly secured thereon. A co-operating clutch member 86, disposed between the clutch member 84 and the drive roll 15, is longitudinally-slidably keyed to the shaft 19 and has an annular recess for the reception of a loosely-related yoke or clutch shift ring 87 that is provided on its upper side with apertured lugs 88 for the reception of a pin 89 by which it is pivotally connected to a rod 90. A tubular member 91 is longitudinally-slidably fitted over the rod 90 and has a flattened apertured portion 92 at its upper end for the reception of a pin 93 by which it is pivoted to an arm 94 of a bracket 95 that is loosely mounted on the rod 28 and held stationary with respect thereto by a brace 96 mounted on the block 25. The rod 90 and the member 91 are, therefore, telescopically related to permit relative movement therebetween when the block 25 is adjusted vertically. A compression spring 97 extending between the member 91 and a depending arm 98 on the bracket 95 tends to force the clutch member 86 out of engagement with the clutch member 84. A depending portion 99 on the lever arm 81 of the sprayer 29 carries a bracket 100 for supporting an adjustable screw 101 that engages the member 91 to force the clutch members 87 and 84 together when the lever arm 81 is actuated to start the spraying operation. A movable latch member 102 on the sprayer 29 is adapted to engage a co-operating stationary latch member 103 on the lever 81 to hold the latter in its depressed or spraying-actuating position with respect to the sprayer 29.

The pinion 85 meshes with a gear 104 supported on the rear side of the plate 12 by a shaft 105 that also carries a pinion 106 which engages a gear 107. The gear 107, supported on the plate 12 by a shaft, 108 in a bearing 109, is provided with a substantially circular cam plate 110, having a curved projection 111 thereon. Since the drive roll 15 rotates a certain number of times with each revolution of a tire thereon, a suitable gear reduction between the roll 15 and the cam plate 110, through the shaft 19, the clutch members 86 and 84, the sleeve 85 and the pinions and gears 85, 104, 106 and 107, may be caused to effect a single rotation of the cam plate 110 for any desired size of tire, in this instance, the reduction being proportioned to effect a rotation of the cam plate 110 with one rotation of a tire of relatively-small diameter. Other similar cam plates, such as a cam plate 112 which has a further gear reduction with respect to the roll 15 through a gear 113 and a pinion 114, may be provided to rotate once for any desired size of tire, the pinion 114 being mounted on the shaft 108 and the gear 113 being mounted, with the cam plate 112, on a shaft 115 supported by a bracket 116 attached to the plate 12. In this instance, the cam plate 112 is shown as geared to rotate once with each rotation of a tire of relatively-large diameter.

A rock shaft 117, having bearings in the top edge of the plate 12 at the sides of a recess 118 therein, supports a horizontal rearwardly-extending arm 119 that is slidably adjustable therealong and provided with a set screw 120 for fixing it in adjusted position. A depending member 121, carrying a roller 122 for engagement with the cam plate 110, is slidably mounted on the arm 119 and has a set screw 123 for fixing it in adjusted position thereon. Thus, by moving the arm 119 along the shaft 117 and the member 121 along the arm 119, the roller 122 may be adjusted to engage either of the cam plates 110 or 112.

At the front side of the plate 112 a vertically-projecting link or arm 124 having a slot 125 thereon is rigidly secured to the shaft 117 near one end thereof. A horizontal rod 126, having a length-adjusting turnbuckle 127 thereon, and a projection 128 at its outer end, is supported in a bearing arm 129 of the bracket 95 and has, at its inner end, a laterally-bent or projecting portion 130 that extends through the slot 125 in the arm 124. A compression spring 131, extending between the bearing arm 129 and a collar 132 secured to the rod 126 biases the latter to the right, as shown in Fig. 20, to normally maintain the projection 128 clear of a laterally-projecting pin 133 on the latch member 102. As in the relation between the rod 90 and the member 91, the slot 125 in the arm 124 permits the rod 126 to be carried with the block 25, when the latter is adjusted vertically, and to maintain its operative relation with respect to the arm 124. The relation between the projection 128 on the rod 126 and the pin 133 on the latch member 102 permits the pin 133 to clear the projection 128 when the spreader roll 27 and the sprayer 29 are moved about the rod 28 by the handle lever 26 to inoperative position.

When the sprayer 29 is first moved from its substantially vertical inoperative position to its operative position shown in Fig. 20, the latch member 103 of the lever 81 being then disengaged from the latch member 102, the screw 100 does not engage the member 91 but is caused to do so when the lever 81 is actuated to start the spraying operation. This moves the member 91, the rod 90, the yoke 87 and the clutch member 86, against the action of the spring 97, to engage the clutch members 86 and 84 to rotate the train of gears to the cam plate 110. When the cam plate 110 completes one revolution in the clockwise direction, as viewed from the rear of the plate 12 in Fig. 21, the projection 111 engages the roller 122 to lift the arm 119. This rocks the shaft 117 in the counter-clockwise direction, as viewed in Fig. 20, to move the arm 124 and the rod 126 against the action of the spring 131 and thus cause the projection 128 to engage the pin 133. Thus engaged, the pin 133 disengages the latch members 102 and 103 to release the lever arm 81 and stop the spraying operation.

Referring particularly to Figs. 3, 12 and 15, the block 25 is shown as having a projection 134 through which a worm screw 135, that is rotatably mounted on the plate 12, extends for raising and lowering the block.

Referring to Figs. 1, 3 and 5, the adjustable mechanisms 37 comprise similar members 136 one each of which is attached to the lower ends of the arms 36 and to the posts 2 and 5 opposite the ends of the arms 36. Pivoted to, and disposed in, the members 136 by pins 137, relatively-short tubular members 138 receive corrugated or annularly-grooved rods 139 at the ends of which the guide rods 38 are supported. Rings 140 embracing the members 138 support screws 141 that register with openings in the members 138 to engage the grooves in the rods 139. By withdrawing the screws 141 a relatively-short distance from the rods 139, the latter may be quickly adjusted laterally with respect to a tire.

In Fig. 6 a modified form of device, one or more of which may be utilized for adjusting the guide rods 38, is shown as comprising two vertical rods 142 bent near their upper portions to intersect on a common pivot pin 143 that is attached to a member 144 on the arm 35 of the frame 1.

A vertical worm screw 145 having a hand wheel 146 at its upper end, is rotatably supported on the member 144 and carries a traveling nut 147 that is connected by links 148 to the ends of the rods 142.

When it is desired to change the space between the guide rods 38, the hand wheel 146 is rotated to move the traveling nut 147, which movement is transmitted through the links 148 to move the arms 142 about the pin 143.

A pointer 149 on the end of one of the arms 142, co-operates with a graduated scale plate 150 on the arm 35 to indicate the character of the tire for which the rods 38 are adjusted.

In Fig. 7, one of the bearing members 41 that are secured to the plates 11, 12 and 13 for supporting the shaft 40, comprises a yoke 151 secured by a screw 152 to a vertically-adjustable member 153, by bolts 154 rigidly secured to the plate 11 and extending through a slot 155 in the member 153. A member 156 supporting a ball or other bearing for the shaft 40 is movably supported at its top and bottom by screws 157 that extend through the legs of the yoke 151. This form of bearing, providing both automatic and manual adjustment of the shaft 140, is provided by reason of the relatively-great length of the machine and the shaft 40 to compensate for minor discrepancies in the level or positions of the posts 2, 3, 4 and 5.

In Fig. 13, the beam 46 is further provided with a spring-biased buffer 158 for engagement with an adjustable screw 159 that is disposed in a web 160 extending between the lugs 45. This cushions the impact of the beam 46 with the screw 159 when the beam returns to its initial position after the roller has passed over the cam member 48. The idler roll 47 mounted on a cylindrical bearing sleeve 161 that embraces a reduced portion 162 on the end of the beam 46 is held in position by a screw 163. A felt member 164 extends through a transverse opening in the portion 162 to the inner surface of the bearing sleeve 161 and is supplied with lubricating material through a longitudinal opening 165, that communicates with an opening 166 in the beam 46.

The arm 50 is provided with a projection 167 to engage a spring plunger rod 168 in the link 51. This biases the link in the clockwise direction, as viewed in Fig. 13, and prevents it from engaging the chain 22, Fig. 3, which in this construction is disposed relatively close thereto.

In Fig. 14, the spreader roll 27, has ball or other freely rotatable bearings 169 on a tubular member 170 of the handle lever 26 that is secured to a member 171. The rod 28 may be divided, as shown in Figs. 14 and 15 and the sections thereof that are rigidly secured to the member 171 be movably supported in lugs 172 of the block 25. A rod 173, pivoted at its outer end to a bell crank handle lever 174 that is pivoted to a lug 175 on the member 170, extends through the members 170 and 171 to the inner end of the latter where an annular projection 176 is provided to receive a spring-pressed plunger 177 in the block 25.

When the lever 174 is actuated to press the rod 173 against the action of a spring 178, the inner end of the rod 173 moves the rod 177 away from the projection 176 to permit the lever 26 and the spreader roll 27 to be rotated in the clockwise direction about the rod 28 to inoperative position where the member 171 engages a spring biased buffer 179.

Figure 16:
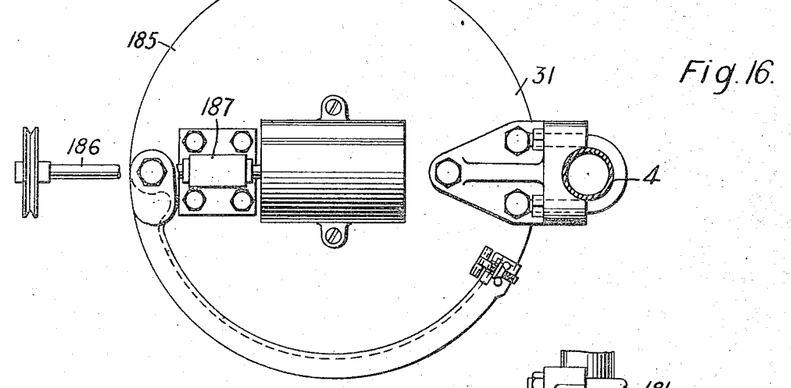
Fig. 16 is an enlarged top plan view of the coating material tank shown in Fig. 1.
Figures 17, 18:
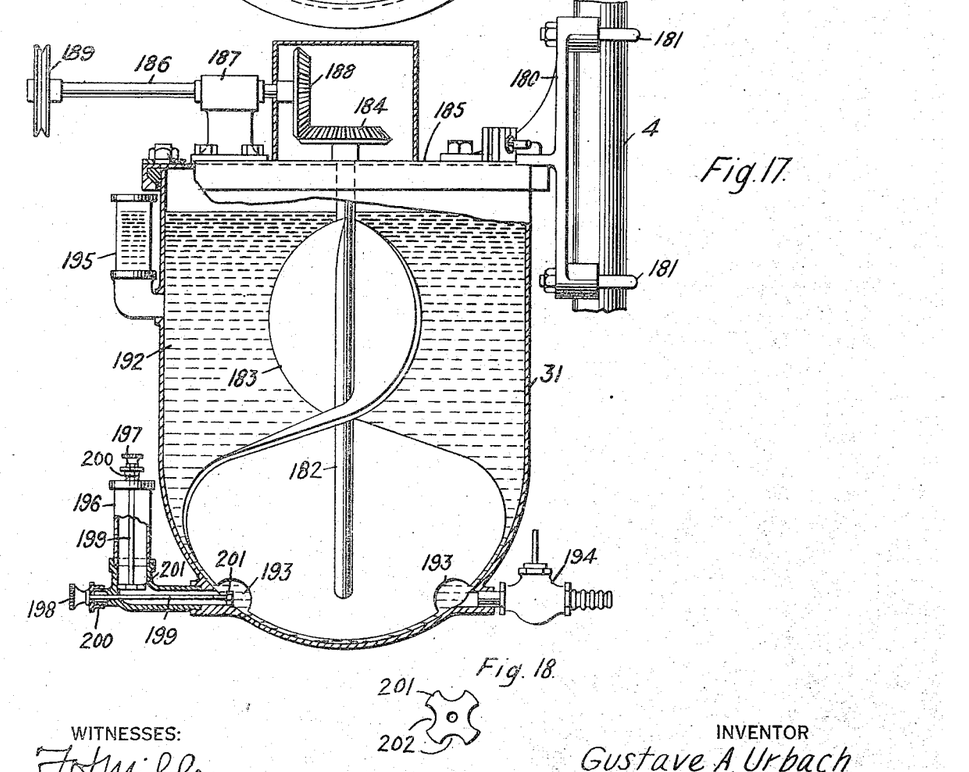
Fig. 17 is a view, partially in elevation and partially in section, of the tank shown in Fig. 16 illustrating the agitator and a gauge embodied in my invention and particularly adapted for my improved machine.
Fig. 18 is a detail view of a member of the gauge shown in Fig. 17.

In Figs. 16 and 17, the tank 21 supported on the post 4 by a bracket 180 and U-bolts 181, is provided therein with a vertical shaft 182 supporting an agitator 183 and a miter gear 184 at its upper end outside a lid 185 therefor.

A horizontal shaft 186 supported in a bearing member 187 on the lid 185 has at one end a similar gear 188 meshing with the gear 184 and at its other end a pulley wheel 189 that is connected by a rope or belt 190. Fig. 2, to a pulley wheel 191 on the shaft 19.

The agitator 183 is shaped similar to a propeller blade but relatively closely fits the rounded bottom of the tank 21 and tapers gradually to substantially a point near the level of a coating liquid 192 in the tank. This form of agitator stirs the liquid, which is a rapidly-settling hard-setting mixture, circularly, upwardly and by gradually increasing amounts in proportion to the depth of the liquid.

To prevent pumping in the hose 30, which a closely fitting agitator rapidly passing the outlet from the tank to the hose would cause, recesses 193 are formed in the lower edges of the agitator 183 at the points where the latter passes a draw-off cock 194 for attachment to the hose 30. This provides an annular zone of substantially semi-circular cross-sectional area from which the liquid is drawn substantially undisturbed.

By reason of the fact that the liquid 192 is of a rapidly settling nature and that its upper region is relatively thin at all times, two gauges 195 and 196 are attached to the tank 31 for indicating the upper and lower levels of the liquid, the upper gauge 195 being an ordinary liquid gauge.

The gauge 196 is secured to the tank at a point opposite the recesses 193 in the agitator 183 and has cleaning plungers 197 and 198 in its vertical and horizontal passages, respectively. These plungers, comprising relatively-thin rods 199 that extend through packing boxes 200, have discoidal washers or pistons 201 at their inner ends. The pistons 201 have spaced recesses 202, Fig. 18, about their edges which permit the ready operation thereof at all times. By periodically reciprocating the plungers 197 and 198 along their axes and, at the same time, imparting a turning movement thereto, the gauge 196 is maintained freely operative.

Being directly associated with the operating mechanism in the application of a specific material in a specific manner and wherein, by their co-operation, a great measure of success has been attained, all of the parts are essential to a complete operative device.

While I have shown and described particular forms of my invention, changes may be effected therein without departing from the spirit and scope thereof, as set forth in the appended claims.

I claim as my invention:

1. In a tire machine, the combination with means for rotating the tire, of manually initiated means for causing the momentum of the tire acquired by being rotated in one position to move the tire into another position.

2. In a tire machine, the combination with means for rotating the tire, of manually initiated means for causing the momentum of the tire acquired by being rotated in one position to effect successive movement of the tire from one position to another.

3. A tire machine having means for effecting a plurality of tire-treating operations and manually initiated means for causing the momentum of the tire to shift the same from one position to another to receive said operations.

4. A tire machine having means for effecting a plurality of tire-treating operations and manually initiated means for simultaneously shifting tires by their own momentum from one position to another to receive said operations.

5. A tire machine having a plurality of positioning means whereat a succession of tires are received and treated and wherefrom the tires are discharged and means for releasing and shifting the tires by their own momentum from position to position of said positioning means.

6. A tire machine having a plurality of positioning means whereat a succession of tires are received and treated, and wherefrom the tires are discharged, and means for shifting the tires by their own momentum from position to position of said positioning means.

7. In an apparatus for the treatment of tires, the combination with means for supporting and treating a tire while in supported position, of manually initiated means for moving the tire by its own momentum to and from said position.

8. In an apparatus for the treatment of tires, the combination with means for revolving and treating a tire while in the revolving position, of means for causing the tire to move by its own momentum to and from said position.

9. In an apparatus for the treatment of tires, the combination with means for supporting a tire, of means for treating the tire while in supported position, and manually initiated means co-operating with said treating means for causing the tire to move by its own momentum to and from said supporting means.

10. A tire machine comprising a plurality of tire-rotating supports, stationary tire-supporting means for rolling a tire to and from said tire-rotating supports, means for treating the tire while in rotated supported position and means for releasing the tire and permitting it to roll along said stationary supporting means.

11. A tire machine comprising a plurality of tire-rotating supports, stationary tire-supporting means for permitting a tire to roll to and from said tire-rotating supports, means for treating the tire while in rotated supported position and adjustable means for guiding the tire along said supports and supporting means.

12. A tire machine comprising a plurality of tire-rotating supports, stationary tire-supporting means for permitting the tire to roll to and from said tire-rotating supports, means for treating the tire while in rotated supported position and co-operatively-connected simultaneously-adjustable members for guiding the tire therebetween and along said supports and supporting means.

13. A tire machine comprising means for supporting and treating a tire while in supported position, and co-operatively-connected simultaneously-adjustable members for guiding the tire with respect to said position.

14. A tire machine comprising a plurality of tire-rotating supports, stationary tire-supporting means for guiding a tire in rolling to and from said tire-rotating supports, means for treating the tire while in rotated supported position and adjustable means for guiding the tire along said supports and supporting means, and means for indicating the size of the tires for which said guiding means is adjusted.

15. A tire machine comprising means for supporting and treating a tire while in supported position, and adjustable means for guiding a tire with respect to said position and indicating the size of the tire for which it is adjusted.

16. A tire machine having in combination means for rotating a tire, means for treating the tire while it is being rotated and means for causing the rotation of the tire to advance the same by rolling.

17. A tire machine having in combination means for rotating a tire, means for treating the surface of the tire as it is rotated and means for automatically stopping said treatment after one rotation only of the tire.

18. A tire machine having in combination, means for treating a tire, means for moving said means and said tire relatively and means for automatically discontinuing said treatment after one rotation only of the tire.

19. A tire machine having in combination, means for rotating a tire, means for coating the tire as it is rotated and means for so automatically controlling said coating means that it continues for one rotation only of each tire.

20. A tire machine comprising means for treating the interior of a tire and means for so automatically controlling the treating means that a tire is treated through one rotation only.

21. A tire machine having in combination means for moving a tire, means for treating the tire as it is moved and means co-operating with said moving means for actuating the said treating means into and out of operative position.

22. A tire machine having in combination, means for moving a tire, means for treating the tire as it is moved, means for moving said treating means towards and away from the tire and means co-operating with said latter means for initiating the movement of the tire away from said tire moving means.

23. A tire machine having in combination, means for moving a tire, means for treating the tire as it is moved, means for moving said treating means towards and away from the tire and means co-operating with said latter and said tire moving means for so changing the center of gravity of the tire as to cause its momentum to move the tire away from said tire moving means.

24. A tire machine comprising means for treating the tire, means for moving said treating means with respect to the tire and means co-operating with said latter means for initiating the moving of the tire with respect to said treating means.

25. A tire machine comprising means for supporting and rotating a tire, means for treating the tire as it is rotated, and means for imparting an impulse to the tire to so change its center of gravity as to cause it to roll away from said supporting means by reason of its inertia.

26. A tire machine comprising means for supporting and rotating a succession of tires, means for effecting successive treating operations on the tires while in supported positions, and means co-operating with said treating means for automatically advancing each tire from position to position by its own momentum.

27. A tire machine comprising means for positioning a succession of tires, means for effecting successive treating operations on the tires while in said positions and means for moving the tires to and from said positions by their own momentum.

28. A tire machine comprising means for positioning a succession of tires, means for effecting successive treating operations on the tires while in said positions and means for automatically moving the tires to and from said positions by their own momentum.

29. A tire machine comprising means located in one position for coating a tire and separate means located in another position for rotating the same to dry it after it has been coated and means for causing the tire to move from the coating to the drying position by its own momentum.

30. In a tire machine, the combination with means for supporting and coating a tire while in supported position, of separate means for rotating the tire in another position to dry it after it has been coated and means for causing the tire to move by its own momentum from one position to the other.

31. In a tire machine, the combination with means for rotating and coating a tire while it is being rotated, of separate means for receiving the tire preparatory to being coated, and separate means for receiving the tire to rotate and dry the same after it has been coated and means for causing the tire to move from one receiving means to another by its own momentum.

32. A tire treating machine comprising means for progressively treating a tire and means for indicating the position on the tire where treatment began.

33. A tire treating machine comprising a spraying device, a spreading device, a single means for moving the spraying device and spreading device into position and for initiating the movement of the tire away from the treating position by its own momentum.

34. A tire treating machine comprising a tire coating device, a spreader, and means dependent upon the positioning of the spreader for so automatically controlling the coating device that the application of the coating material is precluded from overlapping.

In testimony whereof, I have hereunto subscribed my name this 16th day of July, 1919.

GUSTAVE A. URBACH.